No. 756,098. PATENTED MAR. 29, 1904.
G. F. CONNER.
CORN HUSKER AND SHREDDER.
APPLICATION FILED FEB. 17, 1902.
NO MODEL. 5 SHEETS—SHEET 4.
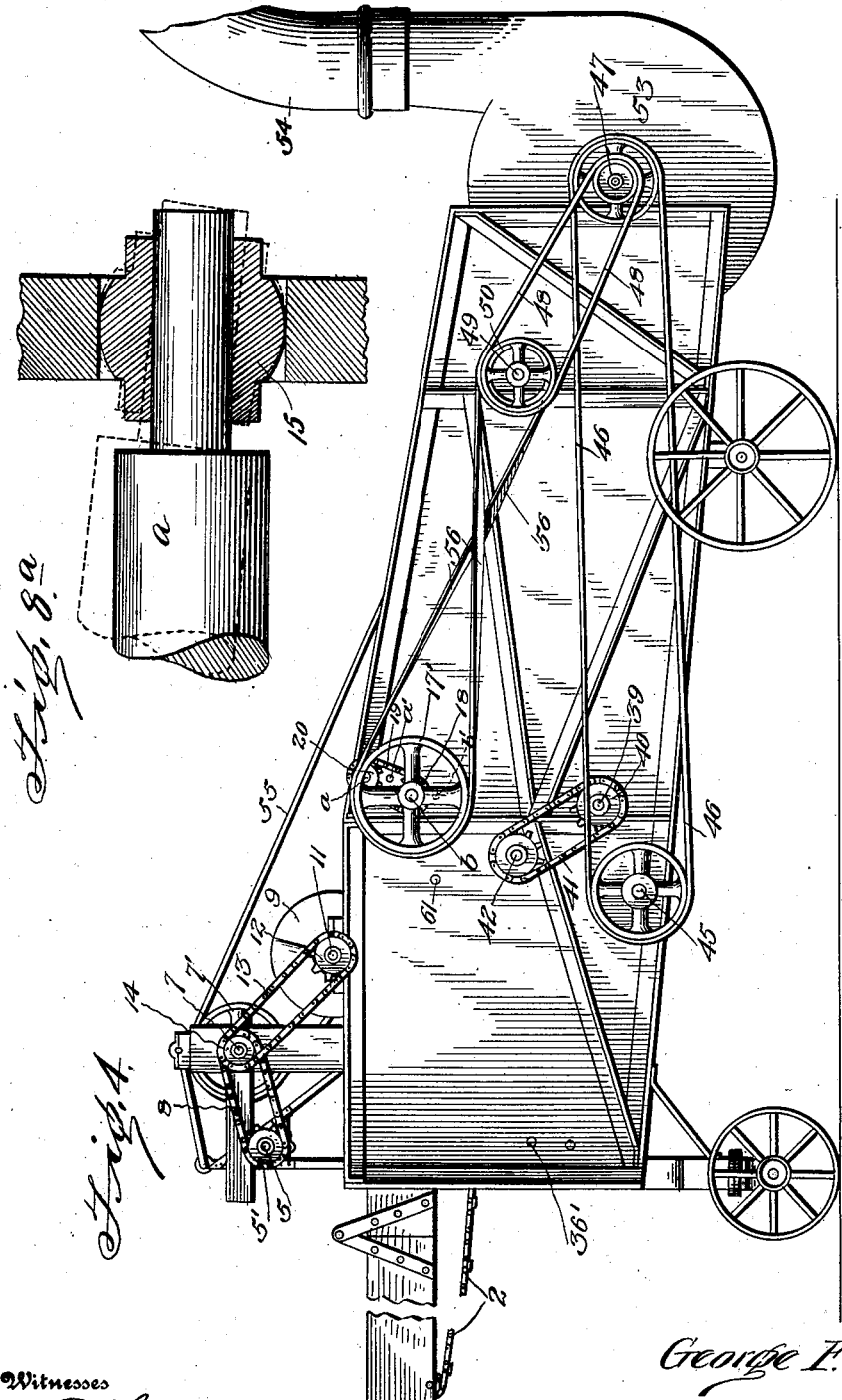
Witnesses
Inventor
George F. Conner
By H. B. Willson & Co.
Attorneys

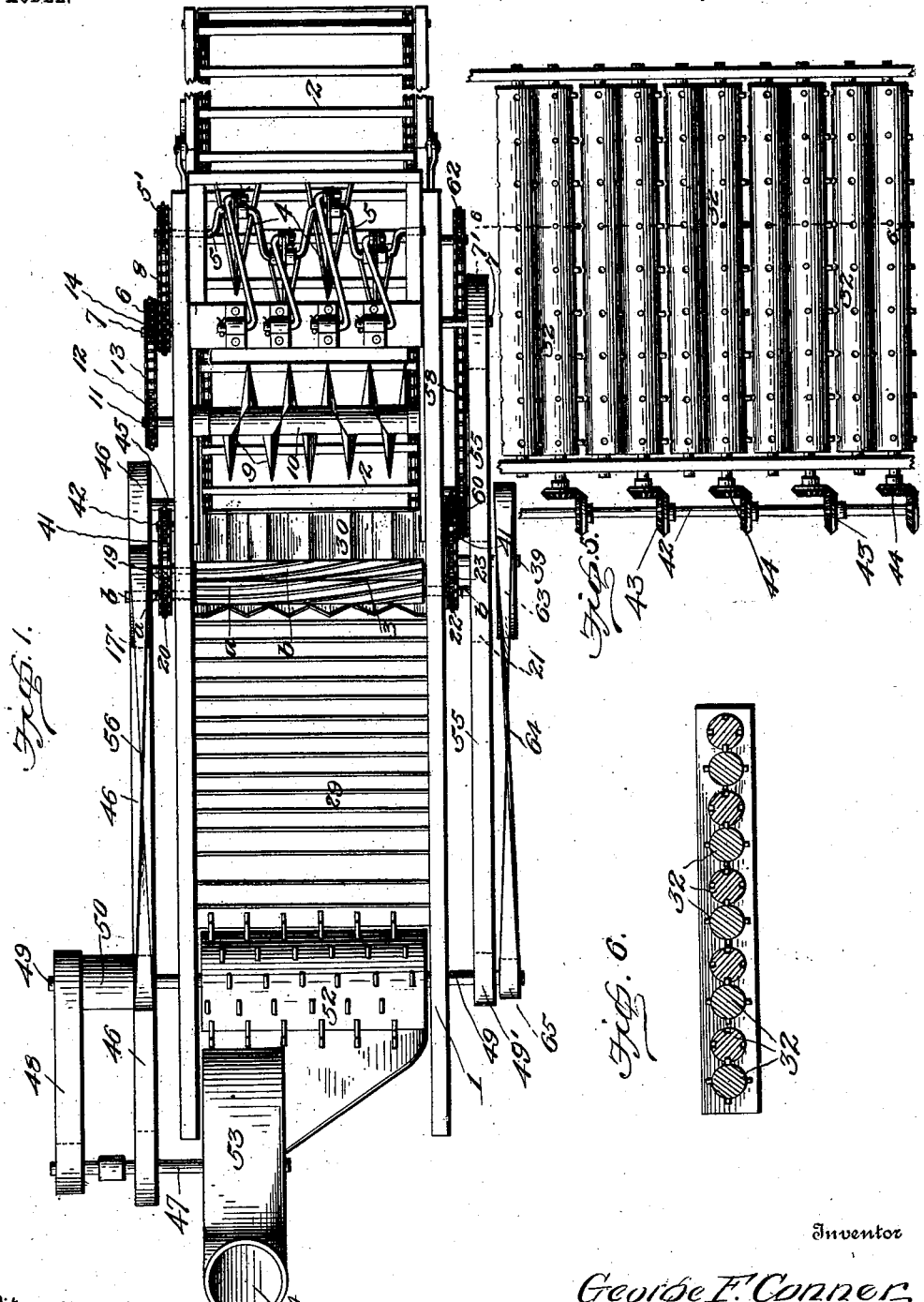

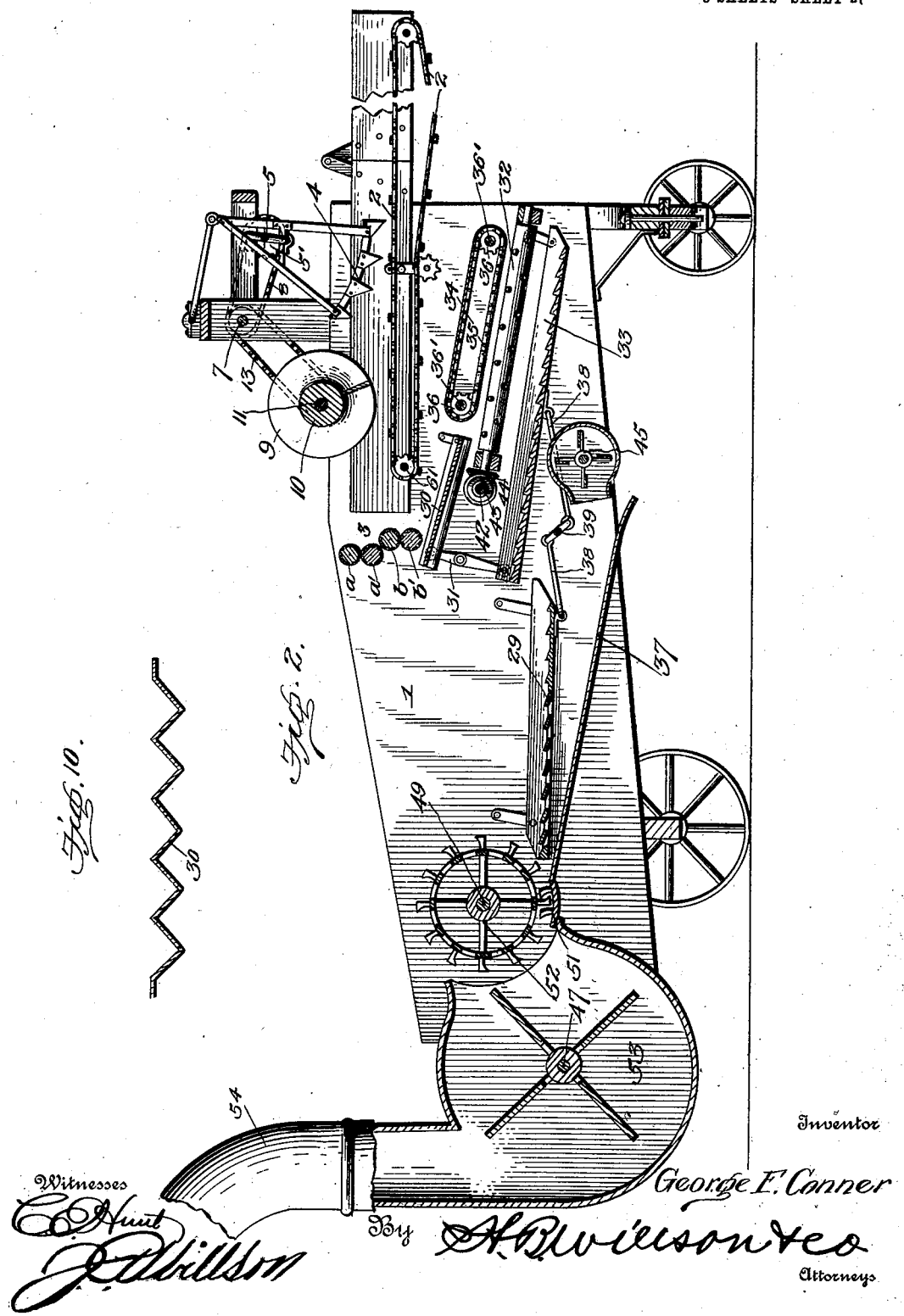

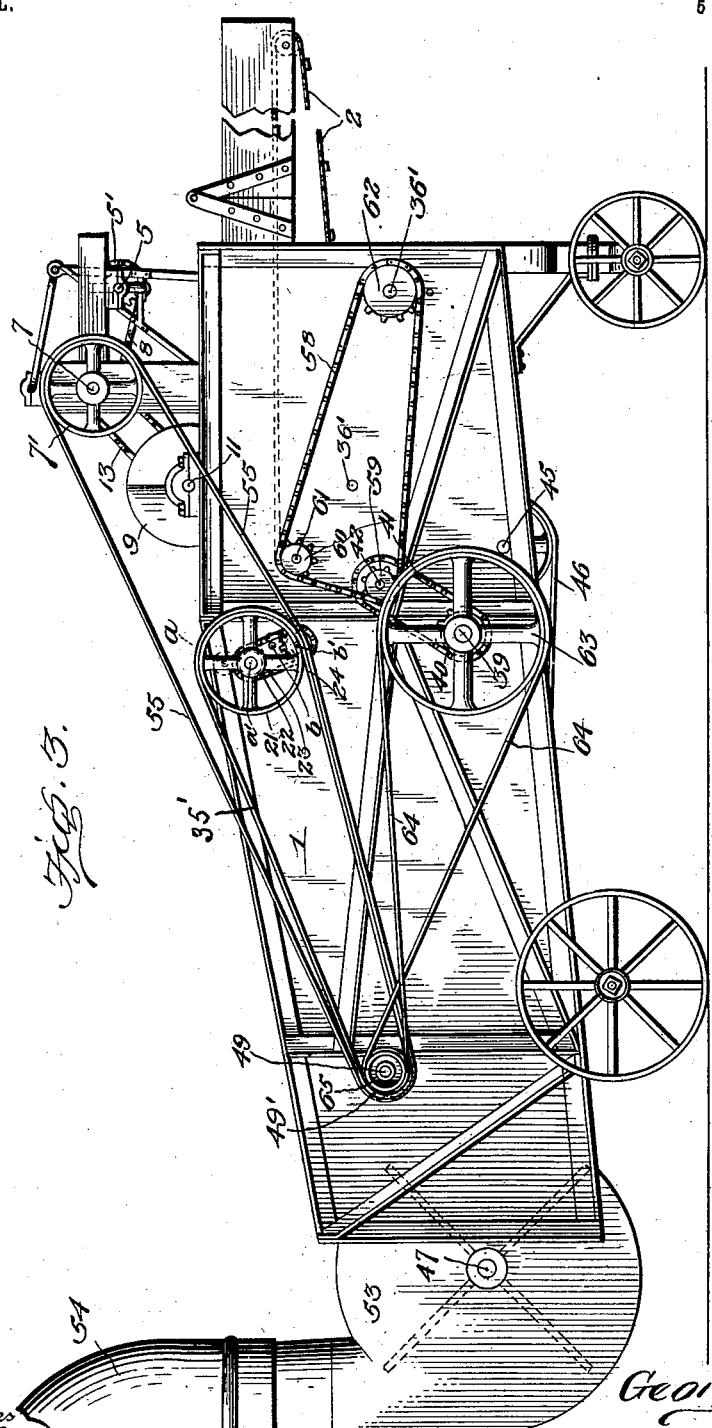

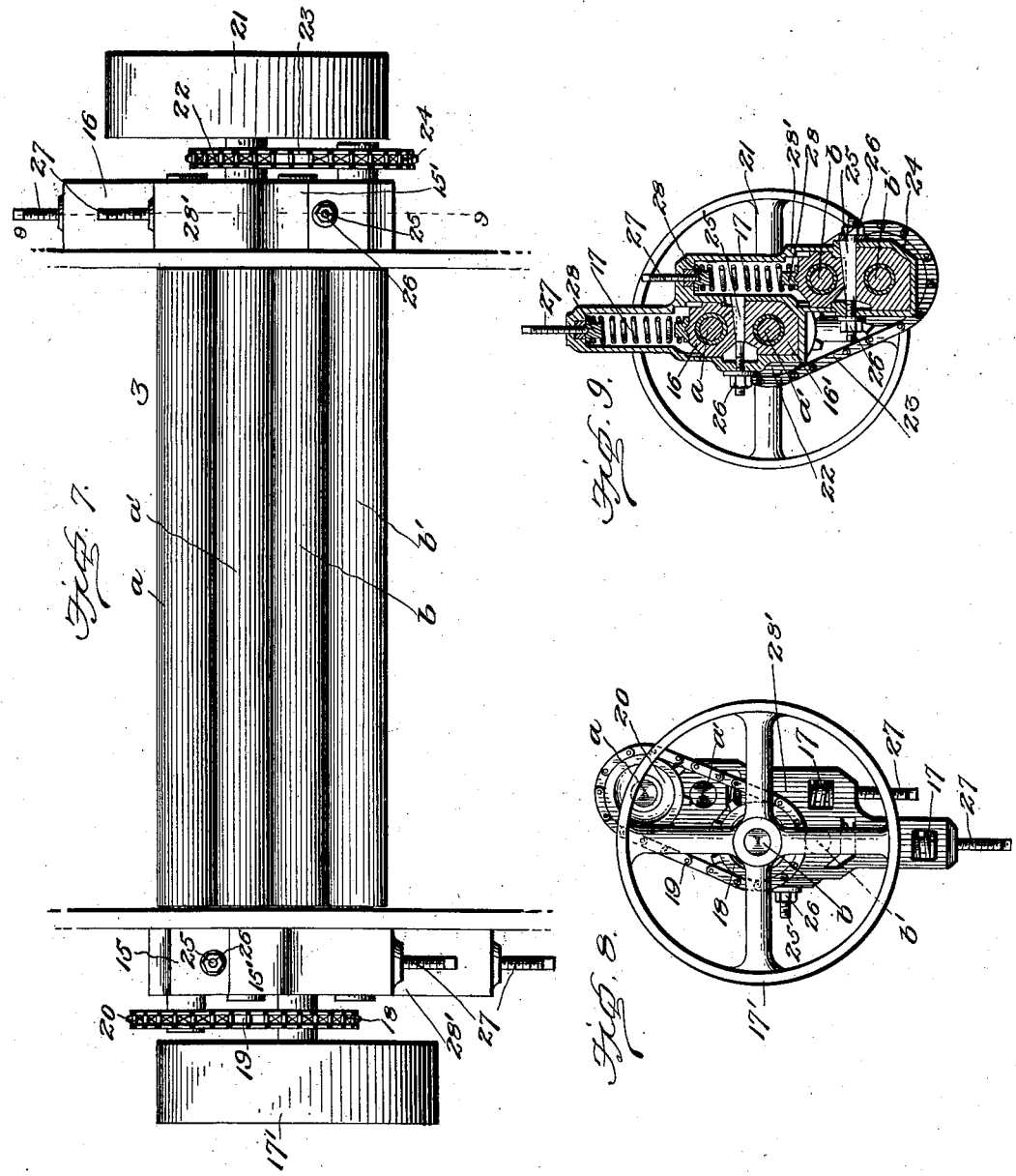

No. 756,098. Patented March 29, 1904.

UNITED STATES PATENT OFFICE.

GEORGE F. CONNER, OF PORT HURON, MICHIGAN.

CORN HUSKER AND SHREDDER.

SPECIFICATION forming part of Letters Patent No. 756,098, dated March 29, 1904.

Application filed February 17, 1902. Serial No. 94,558. (No model.)

*To all whom it may concern:*

Be it known that I, GEORGE F. CONNER, a citizen of the United States, residing at Port Huron, in the county of St. Clair and State of Michigan, have invented certain new and useful Improvements in Corn Huskers and Shredders; and I do declare the following to be a full, clear, and exact description of the invention, such as will enable others skilled in the art to which it appertains to make and use the same.

This invention relates to a combined corn husker and shredder.

The object of the invention is to provide a machine which will continuously, speedily, and efficiently perform the several operations of cutting the bands which bind the stalks into bundles, spreading out the stalks, severing the ears from the stalks, stripping the husks from the ears, collecting the detached grain-kernels, shredding, cutting, or beating the stalks and leaves into a fine mass for use as fodder, and ejecting the chopped mass to a mow or stack, thus effecting a material saving in time and labor over the customary practices wherein these operations are not continuously and successively performed or not effected by the use of automatic mechanism.

The invention also has for its object to simplify and improve the known parts of the husking and shredding mechanism and to arrange them in such manner as to greatly increase their practical efficiency.

A still further object is to provide a novel construction and arrangement of snapping-rolls whereby choking of the rolls is prevented and the capacity of the machine greatly increased.

With these and other objects in view, which will readily appear as the nature of the invention is better understood, the same consists of certain novel features of construction and combination and arrangement of parts, which will be hereinafter fully described, defined in the appended claims, and illustrated in the accompanying drawings, in which—

Figure 1 is a top view of a corn husker and shredder embodying my invention, the frame appearing in skeleton form in order to clearly disclose the interior parts. Fig. 2 is a vertical longitudinal section of the same. Fig. 3 is an elevation of one side of the machine. Fig. 4 is a similar view of the opposite side of the same. Fig. 5 is a detail plan view of the husking-rolls and their driving-gears. Fig. 6 is a cross-section on line 6 6 of Fig. 5. Fig. 7 is a detail front elevation of the snapping-rolls. Fig. 8 is an end elevation thereof. Fig. 8$^a$ is a detail view of the stationary end of a snapping-roll. Fig. 9 is a section on the line 9 9 of Fig. 7. Fig. 10 is a transverse section of the shaking-pan.

Referring now more particularly to the drawings, the numeral 1 represents the frame of the machine, in which is mounted a feeder or endless conveyer 2, which carries the corn previously cut and bound into bundles in the usual manner to the separating devices 3, which pluck or separate the ears from the stalks.

As each bundle of stalks is conveyed along by the carrier the binding-bands thereof are cut by a series of band-cutting knives 4, which receive motion from a compound crank-shaft 5, suitably mounted upon the front portion of the frame. The crank-shaft 5 is provided at one end with a sprocket-wheel 5', which receives motion from a sprocket-wheel 6 on an auxiliary drive-shaft 7 through the medium of a connecting-chain 8. The band-cutting mechanism is preferably of the construction shown in my prior application for patent, filed July 15, 1901, Serial No. 68,416, but may be of any approved type. After the stalks are loosened up by the cutting of the bands they are spread apart prior to their engagement by the separating devices, so as to enable the stalks to be acted upon in a separated state and to prevent crowding and choking of the said separating devices in their passage therethrough.

The means for spreading the stalks consists of a revolving disk 9, mounted above the endless conveyer 2 and between the band-cutters 4 and the separating devices 3. This disk is constructed of a central drum, on which is mounted a spiral screw, said screw being right and left hand spiraled from the center each way toward opposite sides of the frame, thereby causing the stalks passing beneath the same to be forced apart and spread laterally, so as to lie in a regular and loosened state to adapt them to be conveniently acted upon by the separating devices without the liability of the parts becoming choked or binding.

The drum 10, which carries the spiral screw or disk, is mounted on a shaft 11, which carries at one end a sprocket wheel or pinion 12, which receives motion through the medium of a chain 13 from a sprocket wheel or pinion 14 on the auxiliary driving-shaft 7.

The separating devices 3 consist of a series of sets or pairs of snapping-rolls $a\ a'$ and $b\ b'$, extending transversely of the frame at the inner or rear end of the conveyer 2, the said sets or series of rolls being arranged in different planes or in staggered relation, the lower set or pair of snapping-rolls $b\ b'$ being arranged a little in advance of the set $a\ a'$ or a little nearer to the conveyer 2 for a purpose presently described. One end of each roll is journaled in a stationary box, while the opposite end is journaled in a movable box held in place by means of a coil-spring. As shown in Figs. 7, 8, and 9, the roll $a$ is mounted at one end in a stationary box or bearing 15 and at its opposite end in a movable box or bearing 16, while the roll $a'$ is mounted at one end in a movable bearing 15' and at its opposite end in a stationary bearing 16', the movable bearing 15' being arranged beneath the stationary bearing 15 of the roll $a$ and the rigid bearing 16' beneath the flexible bearing 16, so that the flexible bearing of one roll comes below or above the rigid bearing of the other roll.

The roll $b$ is mounted similar to the roll $a$, while the roll $b'$ is mounted similar to the roll $a'$. Each roll thus has one end rigidly mounted and the other end movably mounted, and the movable boxes 15' 16, which carry the movable ends of the rolls, are held in place by means of a coil-spring 17. It will thus be seen that when the cornstalks enter between these rolls they are free to spring apart by compression of the coil-springs and that one end of each roll is adapted to yield or give, while the opposite end remains stationary. The object of having a stationary end to each roll is to provide a suitable means for the proper driving of each of the four rolls.

The driving of the rolls is accomplished as follows: One end of the roll $b$ has an extended shaft, on which is keyed a band-pulley 17' and a sprocket-wheel 18, from which sprocket-wheel extends a chain 19, which passes around a similar sprocket-wheel 20, keyed upon an extended end of the roll $a$. The roll $a'$ is provided with an extended shaft, on which is keyed a band-pulley 21 and a sprocket-wheel 22, from which sprocket-wheel extends a chain 23, which passes around a sprocket-wheel 24 on the contiguous end of the roll $b'$. By this construction and arrangement of the driving mechanism it will be seen that the rolls $a$ and $b$ are connected by gearing at one side and the rolls $a'\ b'$ by gearing at the opposite side, such gearing connecting between the rigidly-mounted ends of the rolls, so that all four of the rolls will be simultaneously and positively driven and will have the same speed, the rolls $a$ and $b$ rolling together and the rolls $a'$ and $b'$ rolling together, thus forming two pairs or sets of rolls, the rolls of each pair coacting to sever the ears from the stalks passing therethrough, while all receive motion at the same speed from a common source of power.

In order to adjust the rolls the proper distance apart and to prevent them from bearing too hard against each other, wedge-shaped keys 25 are provided, which are inserted between each pair of stationary and movable boxes and are held in position by nuts 26, applied to the ends thereof, said keys by being placed between the boxes serving as supports for each end of the rolls.

The tension of the coil-springs 17 may be increased or diminished by means of set-screws 27 bearing against followers 28, which bear against the outer ends of said springs and hold them properly positioned. The boxes, keys, and springs are mounted within suitable standards or supports 28', attached to the frame of the machine.

The purpose of employing a plurality of sets of snapping-rolls and arranging the rolls in the manner shown and described is to obviate certain objections to the corn husking and shredding machines now in common use. In such machines it has been customary to employ but a single pair of snapping-rolls, and as such rolls must of necessity be of limited diameter their lengths were limited by their strength to resist the strains put upon them, so that the working capacity of the rolls was less than the feeding capacity of the feeder— i. e., when a large bundle was placed upon the feeder a greater amount of corn was fed to the rolls than the latter could take care of— resulting in the gorging of the throat of the machine, which, if not relieved, was liable to cause damage. This gorging or crowding of the stalks was also destructive in causing the crushing and shelling of a large proportion of the small ears of corn. Consequently close attention was required in order to keep the machine at work and reduce the amount of damage to the material, and it has not infrequently happened that the operator in attempting to remove the gorge has lost a hand or an arm by the same being caught in the snapping-rolls or adjacent parts of the machinery. Furthermore, the crowding or gorging of the machine caused the snapping-rolls to be spread so far apart that the smaller ears would often pass through with the stalks and be cut up by the shredder, resulting in their complete loss except as part of the shredded fodder. Again, it was not feasible heretofore to employ a mechanical band-cutter, for the reason that it was impracticable to allow an entire bundle to pass to the rolls at one time, it being necessary to cut the bands by hand and divide up the bundle, allowing only a part of each bundle to enter the snapping-rolls at a time. I overcome these several difficulties by using a battery or series of sets or pairs of rolls and so combining, proportioning, and arranging them relative to each other and to the feeder that the corn as fast as fed up is taken care of, and an entire bundle may be fed to the rolls without liability of gorging the machine and with less injury to or loss of the ears of corn. I am thereby enabled to employ mechanical means to cut the bands and obviate the necessity of manually dividing up the bundles and maintaining a constant watch on the feeder and snapping rolls, a very important result. It will be noted that the sets or pairs of rolls are located in different vertical planes, one below the other and closer to and practically in line with the feeder, the latter serving thus to simultaneously convey the material to both rolls. This is the preferred arrangement; but of course the arrangement may be varied so long as the pairs or sets of rolls are so related as to be supplied with material by the feeder and cooperate therewith under varying conditions and are so combined that one set coacts with or assists in feeding the next adjacent set. In this particularly my invention differs radically from a mere duplication in which a second set of rolls is arranged in rear of the usual single set of rolls or any other haphazard manner without regard to any well-defined cooperative relation to the feeder or to so proportioning and arranging the several elements as to secure the aforesaid new and useful results. By my invention I secure the cooperation of the feeding and snapping devices in such manner as to enable the use of a mechanical band-cutter and the feeding of the material in entire bundles to the snapping-rolls without danger of damage to the machine or material, no extra care or watchfulness being required, as the operator simply throws a bundle upon the feeder and allows the machine to take care of itself. It will be seen that by the arrangement of the sets or pairs of rolls in different elevations or horizontal planes, one in the specific illustration shown in line with and the other above the plane of the feeder, the underlying layer of stalks of the bundle divided by the band-cutter and spreader will be operated upon by the lower set of rolls, while the upper layer will be operated upon by the upper set of rolls, thus preventing crowding or choking of the separating devices, while one roll of each pair is adapted to yield to accommodate the rolls to varying sizes of stalks without in any way affecting the action of the gearing. This arrangement of the rolls to operate as members of a battery or gang of snapping devices to act upon the strata or layers of the stalks is further productive of advantage in that it permits the stalks to be fed to the rolls by a divider (as by a band-cutter and spreader operating as herein described) in a divided or separated state, each set of rolls operating upon a portion or subdivision of the bundle instead of upon the entire bundle, thereby reducing liability of the stalks becoming entangled or massed and choking up the rolls, as would be the case were the stalks acted upon in a mass or body. In addition, in order to secure a still more effective action of the rolls, I arrange the sets of rolls in different vertical planes, so that they will have a conjoint or cofeeding action—namely, so that displaced or irregularly-arranged stalks or stalks of an intermediate layer out of direct line of feed to either set of rolls will be guided, deflected, or fed by one roll of one set to the rolls of the other set, thus adapting the rolls to cooperate under varying conditions with the feeder. In the present specific illustration I have shown the lower pair of rolls disposed closer to the feeder, whereby the upper roll of the lower pair is adapted to act as a deflector against which the lower stalks of the upper layer strike and are deflected upward and guided to the upper pair of rolls, thus securing the conjoint or cofeeding action referred to. A further advantage of using two or more sets or pairs of rolls is the convenience in gearing all the rolls together, so that they will all revolve at a uniform speed, while they may be mounted in such manner as to provide for a flexible yielding action of the rolls—an advantage which cannot be accomplished with a single pair of rolls.

In feeding through the rolls in the described manner a better action on the material is also secured, as the stalks are held apart and loosened up by a part or subdivision of each bundle passing between each pair of the snapping-rolls, which allows the stalks to spread farther apart and adapts the ears to be more easily broken off and to fall down more readily than where the whole amount of material is forced to pass between the rolls of a single pair of snapping-rolls.

In describing each snapping-roll as being mounted in a stationary or rigid bearing at one end and in a movable bearing at the other end it will of course be understood that I employ these terms in a relative sense, since though the stationary bearing may not move the end of the roll journaled therein must pivot therein or have some vertical play in order to allow the other end of the roll to be adjustable with its bearing toward and from the stationary end of the cooperating or companion roll. As shown in Fig. 8ª, each "stationary" box or bearing may have its bore or socket of a size and shape to permit the roll to tilt therein, as indicated in broken lines.

The stalks pass through the rolls and drop upon an oscillating carrier or rack 29, while the ears of corn being too hard and firm to be crushed between the rolls are snapped or broken off and fall down between the inner end of the conveyer 2 and the roll $b'$ onto a shaking-pan 30, which receives motion from a rocking or oscillating arm 31.

The pan 30, which may be properly termed a "valley" pan is formed with longitudinal grooves or corrugations into which the ears fall and by which as a result of the oscillatory or vibratory action of the pan the ears are straightened out so as to be presented in proper position to the husking-rolls 32, which are arranged in parallel relation at a point in rear of the forward end of the inclined pan 30 and lie on a downward and forward inclination, so as to cause the ears to feed along the surface thereof by gravity.

The husking-rolls are arranged to coöperate in pairs, one roll being provided with projections to enter matching recesses in the other roll, said projections being adapted to engage and tear away the husks from the ears, which husks pass downward between the rolls and fall onto a carrier 33, while the ears discharge from the upper surfaces of the rolls onto a suitable conveyer, (not shown,) whereby they are conveyed to a suitable bin or other place of deposit.

Arranged above the husking-rolls is a canvas belt 34, mounted upon a sprocket-chain 35, which receives motion from sprocket-wheels 36 upon two transverse shafts 36'. The lower stretch or run of this canvas belt moves in a plane parallel with and slightly above the upper surfaces of the husking-rolls and is adapted to produce a slight pressure upon the ears to force them downward in order that the husks may be acted upon more forcibly by the pins or projections upon the husking-rolls. The carrier 33 oscillates in a direction longitudinally of the frame and is connected at one end to the rocking arm 31, whereby motion is communicated to the oscillating pan 30.

The husks which fall upon the conveyer 33 are carried thereby rearwardly and deposited upon the carrier 29, which, as before stated, also receives the stalks dropping from the snapping-rolls. This carrier 29 is in the form of a rack composed of slatwork, so that as the stalks and husks are conveyed thereby such kernels of corn as are shelled from the ears during the snapping process are allowed to discharge from between the loosened-up stalks onto a grain-board 37 below, which delivers the kernels at the lower side of the machine.

The two carriers 29 and 33 are operated in unison by crank-rods or pitmen 38 from a crank-shaft 39, which carries a sprocket-wheel 40, which is connected by a chain 41 with a sprocket-wheel on a shaft 42, which shaft 42 carries a series of beveled gears 43, meshing with corresponding gears 44 on the upper ends of the husking-rolls 32, whereby said rolls are driven.

Located beneath and slightly in advance of the shaft 39 is a fan 45, which delivers a blast of air over the surface of the grain-board 37 to clean the falling kernels. The shaft of this fan receives motion through the medium of a belt 46 from an ejector-fan shaft 47, which in turn receives motion through the medium of a belt 48 from a main drive-shaft 49, carrying a main drive-pulley 50, whereby it is adapted to be driven from a suitable source of power.

The stalks, leaves, and husks falling upon and deposited upon the conveyer-rack 29 are fed rearwardly by said rack to the concave 51 of the cutting, shredding, or beating device, which concave coöperates with a cutting, beating, or shredding cylinder 52, which chops or cuts up the stalks, husks, &c., into a fine mass for use as fodder. This chopped-up or cut-up mass is forced rearwardly by the action of the fan into the casing of a blower or pneumatic ejecting device 53, which receives motion from the shaft 47 and to which is connected a chute 54, whereby the fodder is blown outwardly to be delivered to a mow or stack. The shredding device 52 is mounted upon the main driving-shaft 49, which carries at one end a pulley 49', from which extends a belt 55, which communicates motion to a pulley 7' on the auxiliary driving-shaft 7, whereby said auxiliary shaft is driven. A belt 35' also connects the pulley 49' with the pulley 21 on the snapping-roll $a'$, and thereby drives the rolls $a'$ $b'$. From the opposite end of the shaft extends a crossed belt 56, which passes around the band-pulley 17' on the snapping-roll $b$, and consequently communicates motion to the two rolls $a$ $b$.

Motion is communicated to the feeder 2 and the presser-belt 35 through the medium of the sprocket-chain 58, which passes around a sprocket-wheel 59 on the shaft 42 and thence around a sprocket-wheel 60 upon the drive-shaft 61 of the feeder and around a sprocket-pinion 62 on one of the shafts 36'.

The crank-shaft 39 is driven through the medium of a band-wheel 63 thereon, around which passes a crossed belt 64, which is driven from a pulley 65 on a shaft 49.

From the foregoing description, taken in connection with the accompanying drawings, the construction and mode of operation of the invention will be readily understood, and it will be seen that a machine is provided which is comparatively simple of construction and is adapted to automatically, speedily, and efficiently perform the several operations of cutting the bands of the bundles, separating the stalks, detaching the ears from the stalks, collecting the shelled grain, removing the husks from the ears, shredding or otherwise comminuting the stalks, husks, and leaves to adapt them for use as fodder and ejecting the fodder so formed.

By the use of a machine of this character it will be apparent that much time and labor will be saved over the customary process, wherein the several steps of treatment named are not carried out automatically and in continuous order or succession.

In the ordinary construction of corn huskers and shredders the shredding-cylinder is placed directly at or near the snapping-rolls, and the shredding of the stalks is effected as soon as they pass through the snapping-rolls. It is a well-known fact that there is some corn shelled from the ear in the snapping process. The shelled kernels pass through the snapping-rolls and commingle with the stalks and leaves. It is desirable to separate these shelled kernels from the stalks and leaves and prevent them from being carried to the stack or mow, and to accomplish this separating devices of various kinds have been provided, the same consisting, usually, of oscillating racks or other means over which the stalks pass and which are adapted to allow the kernels to fall through and to be discharged at the under side of the machine. It is found in practice that the kernels are very hard to separate from the stalks and leaves after they have been shredded on account of their fine state. In my invention this difficulty is overcome, as the stalks pass over the separating device and the kernels are separated therefrom and from the leaves before said stalks and leaves pass into the shredding device. It will be readily seen that the kernels are separated in a much more thorough manner on account of the stalks being whole in this way than where the separating device is placed back of the shredding device. By locating the shredding device also directly at or near the ejector-fan the entrance of the shredded mass into the fan-casing is facilitated, as it is thrown with some force from the shredding device, whereas it receives but little motion from the separating device.

Changes in the form, proportion, and the minor details of construction may be resorted to without departing from the principle or sacrificing any of the advantages of this invention.

Having thus fully described my invention, what I claim as new, and desire to secure by Letters Patent, is—

1. A plurality of pairs of snapping-rolls mounted in different planes, one pair of rolls being out of alinement with another pair, the axes of said rolls lying transverse to the line of action of the feeder in planes parallel to the line of action of the feeder.

2. In a machine of the character described, the combination with a feeder; of two pairs of snapping-rolls disposed in different vertical planes each pair in a single vertical plane and arranged at right angles to the feeder.

3. In a machine of the character described, the combination with a feeder; of two pairs of snapping-rolls, one pair being located substantially in the plane of delivery of the feeder to act upon the lower layer of stalks, and the other pair being located above the plane of the feeder to act upon the upper layer of stalks, substantially as described.

4. A plurality of pairs of snapping-rolls mounted in different vertical planes, one pair of rolls above and out of alinement with another pair.

5. A plurality of pairs of snapping-rolls mounted in different vertical planes, one pair of rolls above and out of alinement with another pair, each pair comprising two rolls rotative in opposite directions, one roll of each pair being movably mounted, and feeding devices having the range of the plurality of pairs of snapping-rolls collectively.

6. In combination, a feeder, and a battery of pairs of cofeeding snapping-rolls mounted in different vertical planes, each pair in a single plane in front or rear of the plane of another pair and at right angles to the feeder, one pair being adapted to direct or deflect a portion of the material toward another pair.

7. In a machine of the character described, the combination with a feeder; of a plurality of pairs of snapping-rolls coöperating therewith, said pairs of rolls being located in different vertical and horizontal planes with one pair closer to the feeder than the other pair.

8. In a machine of the character described, the combination with a feeder; of a battery or series of sets or pairs of snapping-rolls located in different vertical and horizontal planes, the lower set or pair being closer to the feeder.

9. In a machine of the character described, the combination with a feeder; of a battery of snapping-rolls disposed at right angles to said feeder and arranged in pairs disposed in different vertical and horizontal planes, each roll having a fixed or stationary end and a movable end, the movable ends being arranged alternately at opposite ends of the rolls, and gearing between the fixed end of the roll of one pair and the fixed end of the roll of the other pair.

10. In a machine of the character described, the combination with a feeder; of snapping-rolls arranged at right angles to the feeder in sets or pairs, said sets or pairs being located one below the plane of the other, each roll having a fixed or stationary end and a movable end, the same being located alternately at opposite ends of the rolls throughout the series, gearing between the upper rolls of each pair, gearing between the lower rolls of each pair, the gearing connecting the fixed ends of the rolls, and means for driving each pair of rolls.

11. In a machine of the character described, the combination with a feeder, of two pairs of snapping-rolls, one pair being located substantially in the plane of the feeder to act upon the lower layer of stalks, and the other pair being located above the plane of the feeder to act upon the upper layer of stalks, the lower pair being disposed in a vertical plane in advance of the plane of the upper pair and closer to the feeder, substantially as described.

12. In a machine of the character described, a battery or series of sets or pairs of snapping-rolls, each roll having a stationary bearing and a movable bearing, the movable bearings being arranged alternately at opposite ends of the rolls, and gearing between the fixed end of the roll of one pair and the fixed end of the roll of the other pair.

13. In a machine of the character described, battery or series of sets or pairs of snapping-rolls, each roll having a stationary box or bearing and a movable box or bearing, the same being located alternately at opposite ends of the rolls throughout the series, gearing between the upper rolls of each pair, gearing between the lower rolls of each pair, the gearing connecting the fixed ends of the rolls, and means for driving each pair of rolls.

14. A plurality of pairs of snapping-rolls out of vertical alinement with each other, located in different horizontal planes, the axes of said rolls being transverse to the line of action of the feeder.

15. In a machine of the character described, the combination with a feeder, of a plurality of pairs of snapping-rolls, whose axes are transverse to the line of action of the feeder, the pairs being located in different horizontal planes and out of vertical alinement.

16. In a machine of the character described, a feeder, in combination with a series of sets of snapping-rolls disposed at right angles to the feeder in different vertical and horizontal planes, one set being thus arranged in position to deflect or direct a portion of the material to be acted upon to the other set.

17. The combination with a feeder, of a battery of snapping-rolls arranged vertically in pairs at the delivery end of the feeder, said pairs being located in different horizontal planes, and one pair being disposed out of alinement with the other pair and closer to the feeder.

18. The combination with a feeder, of a plurality of pairs of snapping-rolls extending transversely to the line of delivery of said feeder, said pairs being arranged in different horizontal planes to operate respectively upon stalks of different superposed layers and conjointly upon isolated stalks or stalks of an intermediate layer, one roll of one pair acting as a feeder to direct the said isolated stalks or stalks of the intermediate layer to the other pair or pairs, substantially as described.

19. In a machine of the character described, the combination of a feeder, snapping-rolls at the delivery end of the feeder, husking-rolls beneath the feeder, an oscillating ear-turning device extending between the two sets of rolls, a husk-carrier below the husking-rolls and ear-turning device, a shredder, a carrier and separator arranged between the first-named carrier and shredder, operating mechanism, an operative connection between the ear-turner and underlying carrier, and an operative connection between the two carriers, substantially as described.

In testimony whereof I have hereunto set my hand in presence of two subscribing witnesses.

GEORGE F. CONNER.

Witnesses:
   D. E. PURDY,
   R. J. MUNN.